United States Patent
Jaeschke

[15] 3,704,766
[45] Dec. 5, 1972

[54] ELECTROMAGNETIC FRICTION COUPLING

[72] Inventor: Ralph L. Jaeschke, Kenosha, Wis.

[73] Assignee: Eaton Corporation, Cleveland, Ohio

[22] Filed: Dec. 28, 1970

[21] Appl. No.: 101,698

[52] U.S. Cl. ................................. 188/164, 310/93
[51] Int. Cl. ........................................... F16d 65/34
[58] Field of Search ......... 188/158, 164; 310/93, 103

[56] References Cited

UNITED STATES PATENTS

| | | | |
|---|---|---|---|
| 2,068,654 | 1/1937 | Cadman | 188/164 X |
| 2,951,956 | 9/1960 | Fehr | 310/103 X |

FOREIGN PATENTS OR APPLICATIONS

| | | | |
|---|---|---|---|
| 195,718 | 5/1938 | Switzerland | 188/164 |

*Primary Examiner*—Duane A. Reger
*Attorney*—Teagno & Toddy

[57] ABSTRACT

A brake mechanism for accurately positioning a member to be braked includes a first member and a second member rotatable relative to the first member. The first and second members have friction surfaces thereon which are engaged during braking of the members. A coil is provided for establishing a magnetic field having lines of flux which travel through a flux path, to thereby develop a braking torque between the first and second members. The first and second members each include a plurality of spaced apart magnetic conductive portions thereon through which the flux lines pass. When the conductive portions of the first and second members are aligned, the intensity of the flux lines in the flux path is maximized resulting in the frictional engagement of the first and second members and causing the rotation of the second member to be stopped at a predetermined position.

12 Claims, 5 Drawing Figures

PATENTED DEC 5 1972 3,704,766

INVENTOR
RALPH L. JAESCHKE
BY Teagno and Toddy
ATTORNEYS

INVENTOR
RALPH L. JAESCHKE
BY Teagno and Toddy
ATTORNEYS

ELECTROMAGNETIC FRICTION COUPLING

The present invention relates to an incremental motion drive and more specifically to a brake mechanism for accurately stopping a rotatable member at predetermined positions. The present invention further relates to an electromagnetic brake mechanism having a field coil, the energization of which causes braking of the rotatable member and means for controlling the flux of the field to positively position the movable member as it is braked.

In applications where precise incremental motion and control is essential, the position of the member being braked is many times critical. In some known brakes the stopping accuracy is insufficient for applications involving critical positioning and in other known brakes, while the stopping accuracy is initially sufficient, prolonged use of the brake over a period of time effects a decrease in the accuracy of the brake. Moreover, in brakes which utilize a substantially constant braking torque, humidity, temperature and wear can decrease the stopping accuracy of the unit.

Accordingly, it is an object of the present invention to provide a new and improved brake mechanism for accurately positioning a member to be braked which overcomes the hereinabove discussed disadvantages by utilizing a braking torque which increases as the member to be braked moves into a predetermined position where it is to be stopped.

Another object of the present invention is to provide a new and improved brake mechanism for accurately positioning a member to be braked including a first member, a second member rotatable relative to the first member, coil means for producing a field, friction surfaces on the first and second member for braking movement between the first and second members in response to energization of the coil means, and means for controlling the intensity of the flux lines of the field to thereby stop the second member in a predetermined accurately controllable position.

A further object of the present invention is to provide a new and improved brake mechanism for accurately positioning a member to be braked including a first member having a plurality of first spaced apart magnetic conductive portions, a second member having a plurality of second spaced apart conductive portions thereon and rotatable relative to the first member, friction surfaces located on the first and second members for stopping movement of the second member relative to the first member, and coil means energizable to establish a magnetic field for developing a braking torque between the first and second members and wherein the first and second spaced apart conductive portions control the intensity of the flux of the magnetic field so as to maximize the flux intensity and the braking torque developed between the friction surfaces so as to brake the second member when the first and second conductive portions are aligned with one another to thereby stop rotation of the second member in a predetermined position.

A still further object of the present invention is to provide a new and improved brake mechanism for accurately positioning a member to be braked as recited in the next preceeding paragraph and further including a second coil means energizable to create a magnetic field for stopping movement of the second member, and wherein the first member further includes a plurality of third spaced apart conductive portions thereon and the second member includes a plurality of fourth spaced apart conductive portions thereon, the third and fourth spaced apart conductive portions acting to maximize the flux of the magnetic field created by the second coil means and the braking torque developed between the friction surfaces when the third and fourth conductive portions are aligned with one another, to thereby accurately position the second member relative to the first member in a second predetermined position.

Further objects and advantages of the present invention will become apparent from the following detailed description of a preferred embodiment thereof taken in conjunction with the following drawings wherein.

The present invention relates to a brake mechanism for accurately positioning a member to be braked. The brake mechanism includes a rotatable member having a plurality of spaced apart conductive portions thereon and a fixed member having a corresponding set of spaced apart conductive portions thereon. A coil is associated with the fixed member the energization of which creates a magnetic field having flux lines which travel through a flux path from the fixed member to the rotatable member. The conductive portions on the fixed member and the conductive portions on the rotatable member are operable to be in either an aligned or a spaced apart position depending upon the degree of rotation of the rotatable member. When the conductive portions on the fixed member are spaced apart from the conductive portions on the rotatable member the intensity of the flux will be minimized and when the conductive portions on the fixed member are disposed adjacent to the conductive portions on the rotatable member the intensity of the flux will be maximized. The fixed and rotatable members each include engageable friction surfaces thereon for stopping the rotation of the rotatable member upon energization of the coil. The friction surfaces engage and brake the rotatable member when the intensity of the flux in the flux path between the fixed member and the rotatable member is maximized. Thus, since the intensity of the flux will be maximized only when the conductive portions of the fixed member are disposed adjacent to the conductive portions of the rotatable member, the rotatable member will assume a predetermined accurately controllable position when it is stopped. The flux path is substantially uneffected by temperature, humidity and wear of the friction surfaces so that accurate positioning of the rotatable member during braking can be accomplished over an extended period of time and therefore the useable life of the brake is considerably increased.

Figure 1:
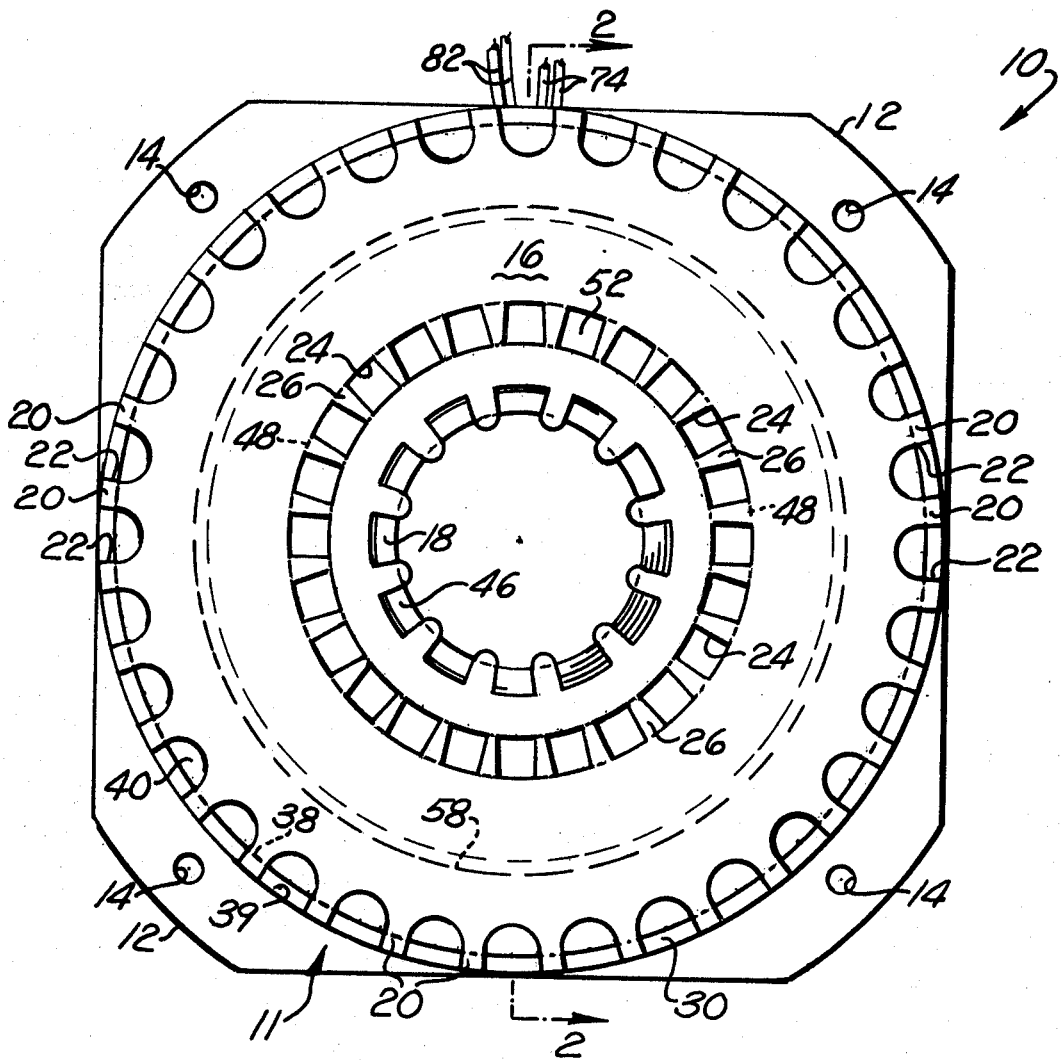
FIG. 1 is a front view of the brake mechanism.

FIG. 1 illustrates the brake mechanism 10 which includes a housing 11 formed in part by a mounting plate 12. The mounting plate 12 has a plurality of openings 14 disposed therein and through which suitable fastener means such as bolts, may be inserted to fix the housing 11 to a rigid structure. The brake mechanism also includes an armature plate member 16 which is rotatable relative to housing 11 between its full line position and its phantom line position illustrated in FIG. 2. The armature plate 16 has a centrally located opening disposed therein which includes a splined portion 18 for enabling the armature plate to be connected to a member to be braked in a well known manner.

Figure 2:
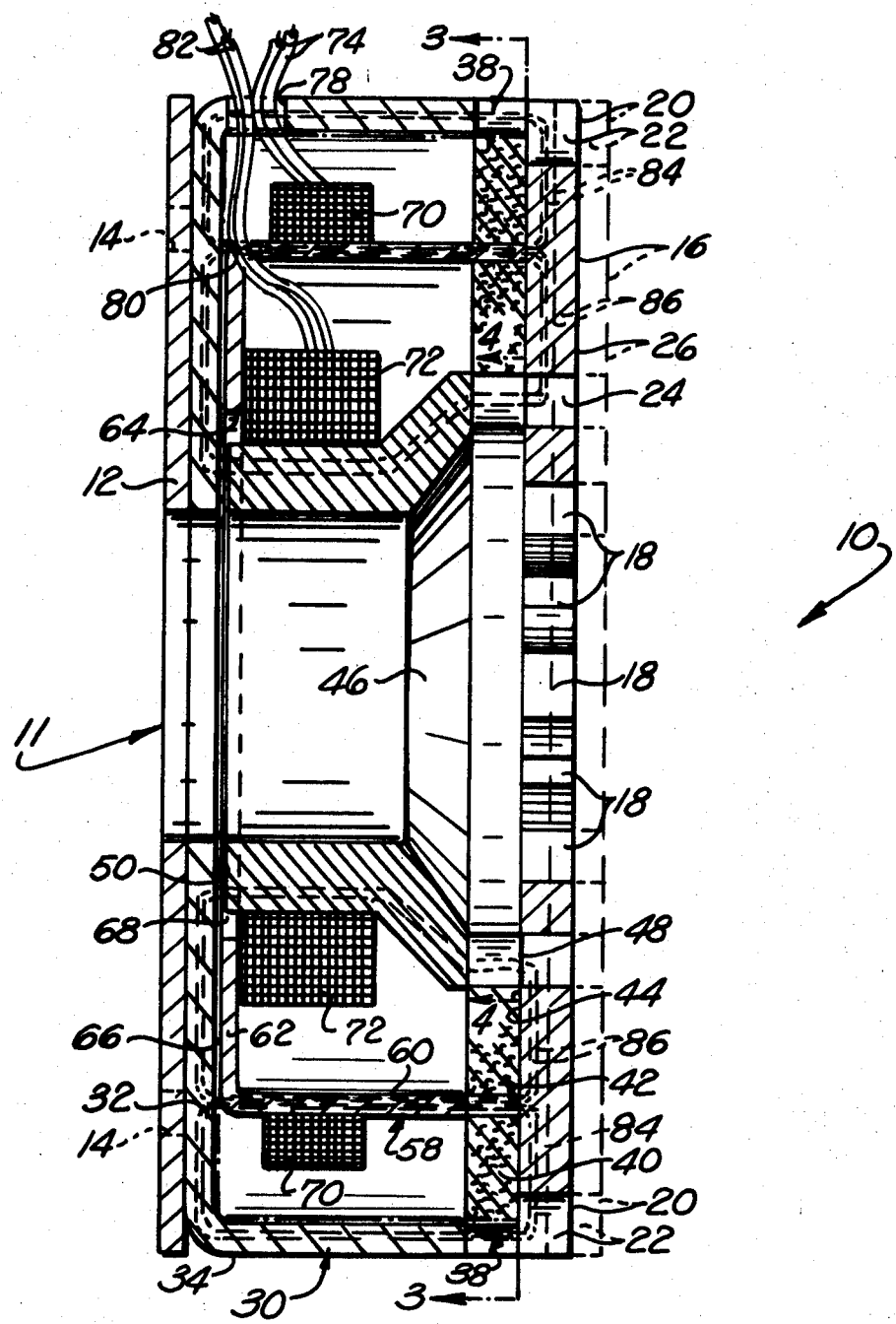
FIG. 2 is a sectional view of the brake mechanism taken approximately along the line 2—2 of FIG. 1 more fully illustrating the cooperation between the armature plate, the outer pole member and the inner pole member.

The brake mechanism includes friction surfaces thereon for braking the relative rotation between the armature plate 16 and housing 11. In the preferred embodiment the friction surfaces include a pair of annular friction plates 40 and 42 which are operable to frictionally engage an inner surface 44 of the armature plate 16 as is illustrated in FIG. 2. When the armature plate 16 is axially displaced from the housing, in its phantom line position as shown in FIG. 2, the friction plates 40 and 42 do not engage the surface 44 of the armature plate 16 and the armature plate is free to rotate relative to the housing 11. Engagement of the armature plate 16 with the friction plates 40 and 42 effects braking of the armature plate 16.

The armature plate 16 has a plurality of spaced apart conductive portions in the form of teeth 20 formed on the outer periphery thereof. The teeth 20 are formed of a suitable magnetic material hereafter referred to as conductive material and are spaced apart by the notches 22 which act to substantially insulate each of the individual teeth 20. Disposed between the splined portion 18 of the plate 16 and the outer periphery thereof are a plurality of openings 24. The openings are separated by conductive portions 26 and the openings 24 serve to substantially insulate each of the individual conducting portions 26 from the next conducting portion.

Figure 3:
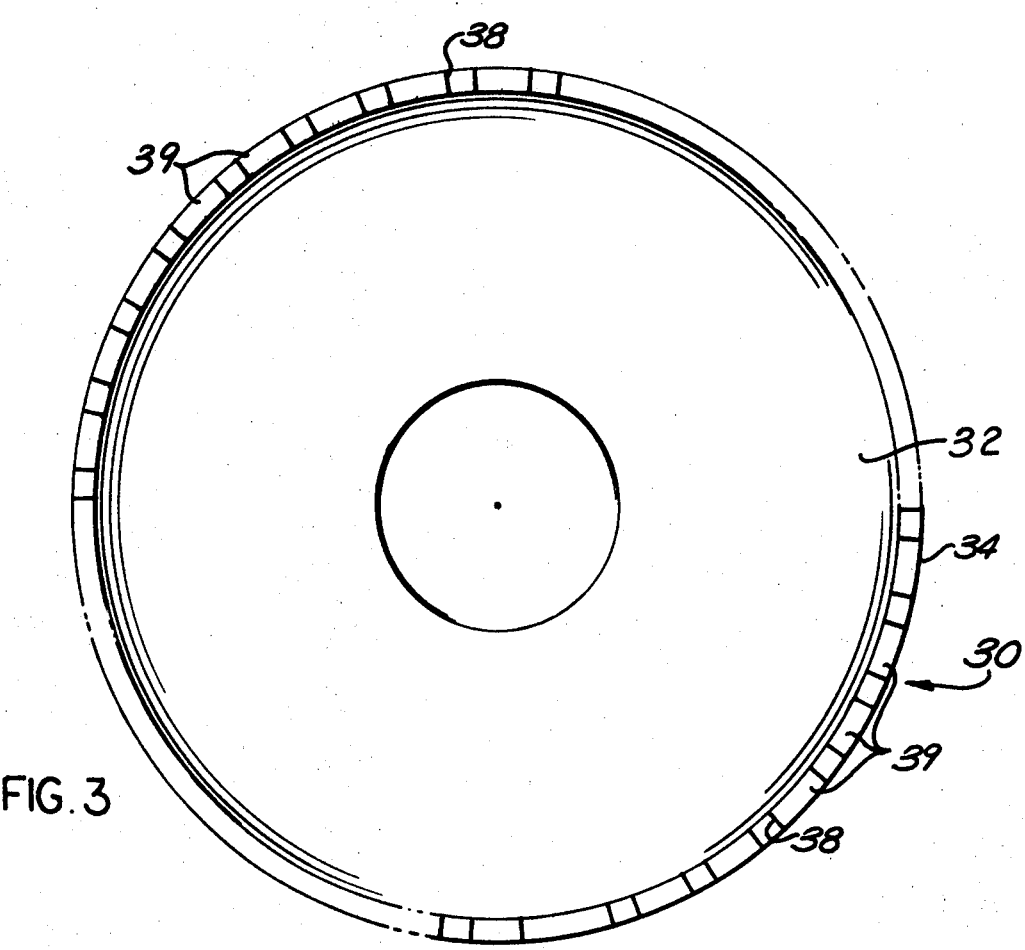
FIG. 3 is a plan view of the outer pole member taken approximately along the line 3—3 of FIG. 2 more fully illustrating the construction thereof and the location of the teeth thereon.

As is illustrated in FIGS. 2 and 3 an outer field housing or outer pole member 30 which forms part of the housing 11 includes a plate portion 32 adapted to be mounted on the mounting plate 12 by suitable means, not illustrated. The pole member 30 includes a cylindrical portion 34 extending at substantially right angles from the plate portion 32. A plurality of teeth 38, more fully illustrated in FIG. 3, are disposed on the outer portion of the cylindrical portion 34 of the outer pole member 30. The teeth 38 are spaced apart by notches 39. It should be apparent from FIG. 1 that the teeth 20 of the armature plate 16 are disposed in a confronting relationship to the teeth 38 of the outer pole member 30. The number of teeth 38 on the cylindrical portion 34 of the outer pole member 30 is equal to the number of teeth 20 disposed on the outer circumference of the armature plate 16 and the spacings or notches 22 between the teeth 20 and the notches 39 between the teeth 38 are the same so that all of the teeth 20 on the armature plate 16 may be aligned with all of the teeth 38 of the outer pole member 30. When the teeth 20 and 38 are aligned they will be disposed substantially adjacent each other. It should be apparent however, that rotation of the armature plate 16 from the position in which the teeth 20 and 38 are aligned and in an adjacent relationship will effect alignment of the teeth 20 with the notches 39 in the outer pole member 30. At this particular point the teeth 20 will be misaligned from the teeth 38 of the outer pole member 30. However, continued rotation of the armature plate 16 will again effect alignment of the teeth 20 with the teeth 38 of the outer pole member 30.

Figure 4:
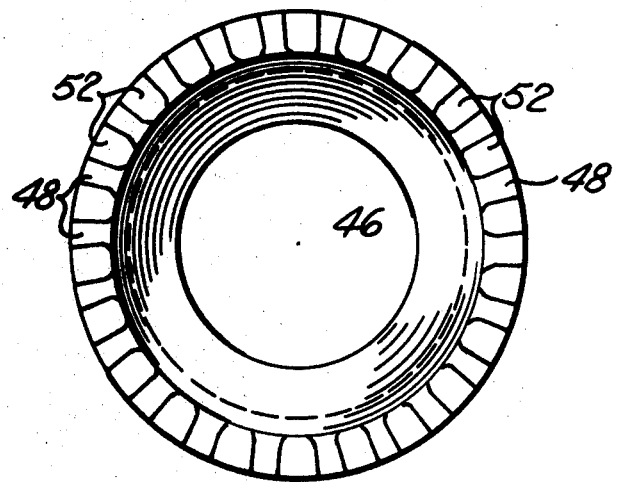
FIG. 4 is a plan view, taken approximately along the line 4—4 of FIG. 2 more fully illustrating the construction of the inner pole housing and the location of the teeth thereon.

An inner coil housing or inner pole member 46, having a substantially cylindrical configuration, is centrally mounted in the housing 11 spaced from the outer field housing 30 by an air gap 50. The inner pole member 46 illustrated in FIGS. 2 and 4 has a plurality of teeth 48 disposed on one end thereof which are spaced apart by notches 52. The teeth 48 of the inner pole member 46 are operable to be aligned with the conductive portions 26 disposed between the openings 24 in the armature plate 16. The number of teeth 48 is equal to the number of conductive portions 26 disposed on the armature plate 16 and the spacing of the teeth 48 and the conductive portions 26 is such that the armature plate 16 may be positioned so that the teeth 48 of the inner pole member 46 are aligned and adjacent to the conductive portions 26 of the armature plate 16 in the same manner that the teeth 38 of the outer pole member 30 are aligned with the teeth 20 of the armature plate 16.

A center pole member 58 whose function will be more fully described hereinbelow, is located in the housing 11 between the outer pole member 30 and the inner pole member 46. The center pole 58 includes a cylindrical portion 60 which is concentric to the outer pole member 30 and the inner pole member 46 and a mounting plate portion 62 which has a circular opening 64 disposed therein concentric to the inner pole member 46. The inner pole member 46 extends into the circular opening 64 of the plate portion 62 and is spaced from the center pole 58 by an air gap 68. The center pole 58 is also spaced by an air gap 66 from the outer pole member 30.

A coil 70 is mounted on the outer surface of the cylindrical portion 60 of the center pole 58. A pair of conductors 74 pass through an opening 78 in the outer pole member 30 and are connected with the coil 70 to provide for energization thereof. A coil 72 is mounted on the outer surface of the inner pole member 46 and pair of conductors 82 extend through the opening 78 in the outer pole member 30 and through an opening 80 in the center pole 58 to provide for energization of the coil 72. Both coils 70 and 72 are circular coils and extend around the periphery of the center pole 58 and the inner pole member 46, respectively. Energization of either of the coils 70 or 72 creates a magnetic field which causes the armature plate 16 to move from its phantom line position shown in FIG. 2 to its position shown in full lines in which the friction plates 40 and 42 engage with the inner surface 44 of the armature plate 16 to stop rotation of the armature relative to the housing 11.

Energization of the coil 70 creates a magnetic field having flux lines which travel through a flux path 84, shown in dotted lines in FIG. 2. The flux path 84, through which the flux lines travel, extends through the cylindrical portion 60 of the center pole 58, across the air gap 66, through the plate portion 32 of the outer pole member 30, through the cylindrical portion 34 of the pole member 30, through the teeth 38 and into the teeth 20 of the armature plate 16. The flux path 84 then passes through the armature 16 as shown in FIG. 2 and back into the cylindrical portion 60 of the center pole 58 to the coil 70.

It should be appreciated that in order for the flux lines to effectively pass through the flux path 84 between the outer pole member 30 and the armature plate 16, the teeth 38 must be aligned with the teeth 20 of the armature plate 16. When the teeth 20 of the armature plate 16 are aligned with the teeth 38 of the outer pole member 30, the flux lines in the flux path 84 are maximized and exert a maximum attraction force on the armature 16 to force the armature plate into engagement with the friction plates 40 and 42. If the teeth 20 are not aligned with the teeth 38 of the outer pole member 30, the intensity of the flux lines in the flux path will be such that the field will not effectively force the armature plate 16 into engagement with the friction plates 40 and 42 and rotation of the armature plate 16 will not be stopped. When the coil 70 is energized the armature plate 16 will move axially toward the housing 11 and continue to rotate until the teeth 38 align with the teeth 20. At this point the force pulling the armature plate 16 into engagement with the friction plates 40 and 42 will substantially increase and the friction plates will effect a braking torque to stop movement of the armature plate 16. Thus, it should be realized that when the coil 70 is energized the armature plate 16 will always cease rotation at a position in which the teeth 20 are aligned with the teeth 38 of the fixed outer pole member 30. Accordingly, the armature plate 16 will stop in a predetermined position which is determined by the position of the teeth 38 on the pole member 30 and the teeth 20 on the armature 16.

Energization of the coil 72 will create a magnetic field having flux lines which travel through a flux path shown by the dotted lines 86 in FIG. 2. The flux lines will pass from the inner pole member 46, through the teeth 48 thereon, through the conductive portions 26 of the armature plate 16, through the armature plate 16 and into the cylindrical portion 60 of the center pole 58. The flux lines will then pass through the air gap 66, through the plate portion 32 of the outer pole member 30, through the air gap 50 and back into the inner pole member 46. It should be apparent that the coil 72 will operate in the manner analogous to the manner in which coil 70 operates. Specifically, energization of the coil 72 will effect movement of the armature plate 16 inwardly so that the friction plates 40 and 42 engage with the surface 44 of the armature plate 16. As the conductive portions 26 of the armature plate 16, align with the teeth 48 of the inner pole member 46 the braking torque will increase and the armature plate 16 will be stopped by the frictional engagement with the friction plates 40 and 42. When the coil 72 is energized the stopping position of the armature plate 16 will be determined by the location of the teeth 48 on the inner pole member 46 and the conductive portions 26 on the armature plate 16.

Figure 5:
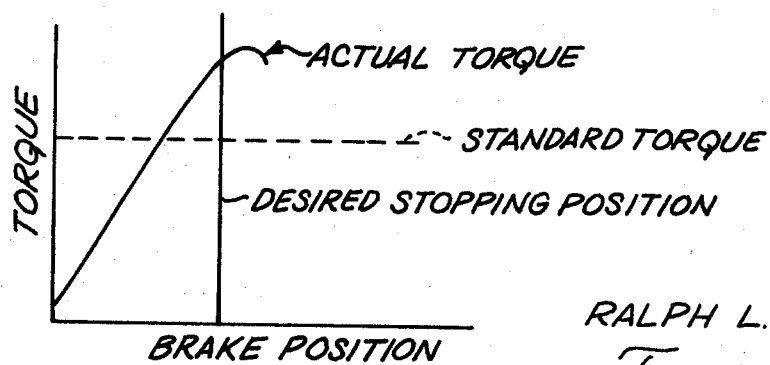
FIG. 5 is a graphical illustration of the stopping torque developed in the brake versus the brake position.

FIG. 5 graphically illustrates the braking torque developed by the brake versus the brake position. It can be seen that as the conductive portions of the armature plate and the teeth of the inner pole member or the outer pole member, depending upon which coil 70 or 72 is energized, align, the braking torque developed between the friction plates 40 and 42 and the surface 44 of the armature plate 16 substantially increases. This is in contrast to a normal electromagnetic brake wherein the braking torque developed is substantially constant as illustrated by the dotted line designed standard torque in FIG. 5. The current is applied to the desired coil when the conductive portions of the armature plate and the inner pole member or outer pole member are unaligned, and since the flux lags the current in time, due to inductance, the conductive portions will become aligned or adjacent each other when the flux is increasing between the armature plate and the inner pole member or outer pole member. Thus, the flux and braking torque will substantially increase and effect stopping of the armature plate 16 when the conductive portions are aligned. It should be apparent from FIG. 5 that the torque will increase further as the desired stopping position, in which the conductive portions of the armature plate and the outer pole member or inner pole member align, is passed to thereby prevent the armature plate 16 from passing the desired stopping position. Since the flux and the torque are substantially maximized at the desired stopping position the armature plate 16 will cease rotation at this time and positive positioning of the armature plate relative to the housing is provided.

While the flux paths have been schematically represented by the lines 84 and 86 it should be apparent that there will be a certain amount of stray flux in the system when the teeth or conductive portions on the armature plate do not align with the teeth on the inner pole member or the outer pole member. However, the effect of this stray flux will be negligible in that only minimal stopping torque will be developed thereby. It should be apparent that the position in which the armature plate 16 is stopped will be dependent upon which coil is energized. If coil 70 is energized the armature will stop at a position wherein the teeth 38 align with the teeth 20 and if coil 72 is energized, the plate 16 will stop at a position in which the teeth 48 align with the conductive portions 26 of the armature plate 16.

The incremental movement of the armature plate 16 is controlled by energizing either coil 70 or coil 72. When coil 70 is energized the incremental movement of the armature plate may be limited to the angular spacing of the teeth 20 on the armature plate 16. When the coil 72 is energized the incremental movement of the armature plate will be limited to the angular displacement between the conductive portions 26 of the armature plate. It should be appreciated that the angular spacing between the conductive portions 26 and the teeth 20 differs, with the angular spacing between the teeth 20 being less than the angular spacing between the conductive portions 26. Accordingly, energization of the coil 70 can be used to provide for incremental movement of the armature plate which is equal to the spacing between the teeth 20 and energization of the coil 72 can be used to provide for incremental movement which is equal to the spacing between the conductive portions 26. Thus, the present brake mechanism can be utilized to provide for incremental rotation of the armature plater 16 in two separate modes, which are dependent upon the spacing between the teeth 20 and the conductive portions 26. While only two coils and two sets of conductive portions have been disclosed it should be appreciated that a multitude of coils and conductive portions could be utilized to provide for incremental rotation of the armature plate through a plurality of predetermined incremental positions which would be dependent upon the spacing between the further conductive portions.

The present invention is easily utilized in the drive mechanism for a printing unit for a computer in which it is necessary to accurately position the material to be printed on. In usual printout operations it is desired to have either six or eight lines of print per inch and the positioning of the matter to be printed on is extremely critical. The present brake mechanism is easily utilized in a computer having a print out that utilizes either the six or eight lines per inch. When it is desired to print six lines per inch the coil 72 may be energized and when it is desired to print eight lines per inch the coil 70 may be energized to thereby stop the material to be printed at its correct location. Because the present invention utilizes a magnetic field, and the flux lines exert a non-linear force on the armature plate i.e., one that increases as the stopping position is reached, accurate positioning of the material may be obtained. Moreover, because nonlinear stopping torque is utilized the operation of the mechanism will not be effected by temperature or humidity or by wear of the mechanism. Thus, it should be apparent that an extremely reliable mechanism has been provided for accurately positioning a movable member.

From the foregoing, it should be apparent that a new and improved brake mechanism for accurately positioning a member to be braked has been provided. The brake mechanism includes a first stationary member having a plurality of spaced apart conductive portions thereon, a second member rotatable relative to the first member and having a plurality of second spaced apart conductive portions thereon, coil means and friction surfaces for braking movement of the second member relative to the first member. The energization of the coil means creates a field having flux lines which pass through a flux path between the first and second members and which are maximized when the first spaced apart conductive portions of the first member are adjacent to the second spaced apart conductive portions of the second member. The maximizing of the intensity of the flux lines increases the stopping torque of the friction surfaces for stopping movement of the second member to thereby positively position the second member relative to the first member. While the present invention has been illustrated in conjunction with a brake mechanism it should be realized that applications of the present invention could be made in a coupling wherein it is desired to accurately position the members to be coupled relative to one another when coupling of the members occurs.

What I claim is:

1. A brake mechanism for accurately positioning a member to be braked comprising a first member, a second member rotatable relative to said first member, said first and second members having friction surfaces thereon which are engaged during braking of said member, means for establishing a magnetic field having lines of flux which develop a braking torque between said first and second members, a flux path, and means for intensifying the lines of flux in said flux path when one of said members is in a predetermined position and for substantially maximizing the braking torque developed between said first and second members for accurately stopping one of said members at a predetermined position said means for intensifying said lines of flux in said flux path including a plurality of first spaced apart conductive portions associated with said first member and a plurality of second spaced apart conductive portions associated with said second member, said first and second conductive portions intensifying said lines of flux in said flux path and substantially maximizing the braking torque between said first and second members when said first conductive portions are aligned with said second conductive portions.

2. A brake mechanism for accurately positioning a member to be braked as defined in claim 1 wherein said first conductive portions comprise a plurality of teeth on said first member, said teeth on said first member being operable to be aligned with said conductive portion on said second member thereby intensifying said lines of flux and said braking torque.

3. A brake mechanism for accurately positioning a member to be braked as defined in claim 2 wherein said second conductive portions comprise a plurality of teeth on said second member said teeth on said first and second members being movable relative to each other and operable to be aligned with each other to thereby intensify said lines of flux and said braking torque.

4. A brake mechanism for accurately positioning a member to be braked as defined in claim 3 wherein said teeth on said first and second members are equally spaced about the periphery of said first and second members respectively, and the number of teeth on said first member equals the number of teeth on said second member.

5. A brake mechanism for accurately positioning a member to be braked comprising a first member, a second member rotatable relative to said first member, said first and second members having friction surfaces thereon which are engaged during braking of said member, means for establishing a magnetic field having lines of flux which develop a braking torque between said first and second members, a flux path, means for intensifying the lines of flux in said flux path when one of said members is in a predetermined position and for substantially maximizing the braking torque developed between said first and second members for accurately stopping one of said members at a predetermined position, second means for establishing a magnetic field having lines of flux which develop a braking torque between said first and second members, a second flux path and second means for intensifying the lines of flux in said second flux path and substantially maximizing the braking torque developed between said first and second member for accurately stopping one of said members in a second predetermined position.

6. A brake mechanism for accurately positioning a member to be braked as defined in claim 5 further including a third member fixed relative to said first member, and wherein said second means for controlling the intensity of said lines of flux includes a plurality of third spaced apart conductive portions associated with said third member and a plurality of fourth spaced apart conductive portions associated with said second member, said third and fourth conductive portions intensifying said lines of flux and substantially maximizing said braking torque when said third and fourth conductive portions are aligned with each other.

7. A brake mechanism for accurately positioning a member to be braked as defined in claim 6 wherein said plurality of third spaced apart conductive portions comprises a plurality of teeth disposed on said third member and wherein the number of teeth on said third member equals the number of said fourth spaced apart conductive portions.

8. A brake mechanism for accurately positioning a member to be braked as defined in claim 5 wherein said means for establishing a magnetic field and said second means for establishing a magnetic field includes first and second coil means respectively, each of said coil means being independently energizable.

9. A brake mechanism for accurately positioning a member to be braked as defined in claim 8 wherein said first coil means is energizable to effect stopping of said second member in one of a plurality of first predetermined positions and said second coil is energizable to effect stopping of said second member in one of a plurality of second predetermined positions.

10. A brake mechanism for accurately positioning a member to be braked comprising a first member having a plurality of first spaced apart conductive portions thereon, a second member rotatable relative to said first member and having a plurality of second spaced apart conductive portions thereon, a flux path, an electrically energizable first coil being operable upon energization thereof to create a magnetic field having lines of flux which travel through said flux path between said first and second members, and friction surfaces on said first and second members which are engageable for stopping said rotational movement, said first and second conductive portions controlling the intensity of said lines of flux in said flux path and substantially maximizing the intensity of said lines of flux when said first and second conductive portions are aligned with one another and said second member is disposed in a predetermined position relative to said first member said lines of flux substantially maximizing the braking torque developed between said first and second members when the intensity of said lines of flux is maximized to thereby stop said relative movement when said first and second conductive portions are aligned with one another and said second member is accurately positioned relative to said first member.

11. A brake mechanism for accurately positioning a member to be braked as defined in claim 10 further including a third member fixed relative to said first member, a second flux path, an electrically energizable second coil operable upon energization thereof to create a magnetic field having lines of flux which pass through said second flux path between said first and second members and means for controlling the intensity of said lines of flux in said second flux path and substantially maximizing the braking torque for stopping said relative movement when said second member is in a predetermined position relative to said third member, said means for controlling the intensity of said lines of flux in said second flux path including a plurality of third spaced apart conductive portions disposed on said third member and a plurality of fourth spaced apart conductive portions disposed on said second member, said third and fourth conductive portions substantially maximizing the intensity of said lines of flux and said braking torque when said third and fourth conductive portions are aligned with one another and said second member is disposed in a predetermined position relative to said third member.

12. A brake mechanism for accurately positioning a member to be braked as defined in claim 11 wherein said first coil is operable upon energization thereof to stop said relative movement in a plurality of first spaced apart predetermined positions and said second coil is operable upon energization thereof to stop said relative movement in a plurality of second spaced apart predetermined positions which are distinct from said first spaced apart predetermined positions.

* * * * *